UNITED STATES PATENT OFFICE.

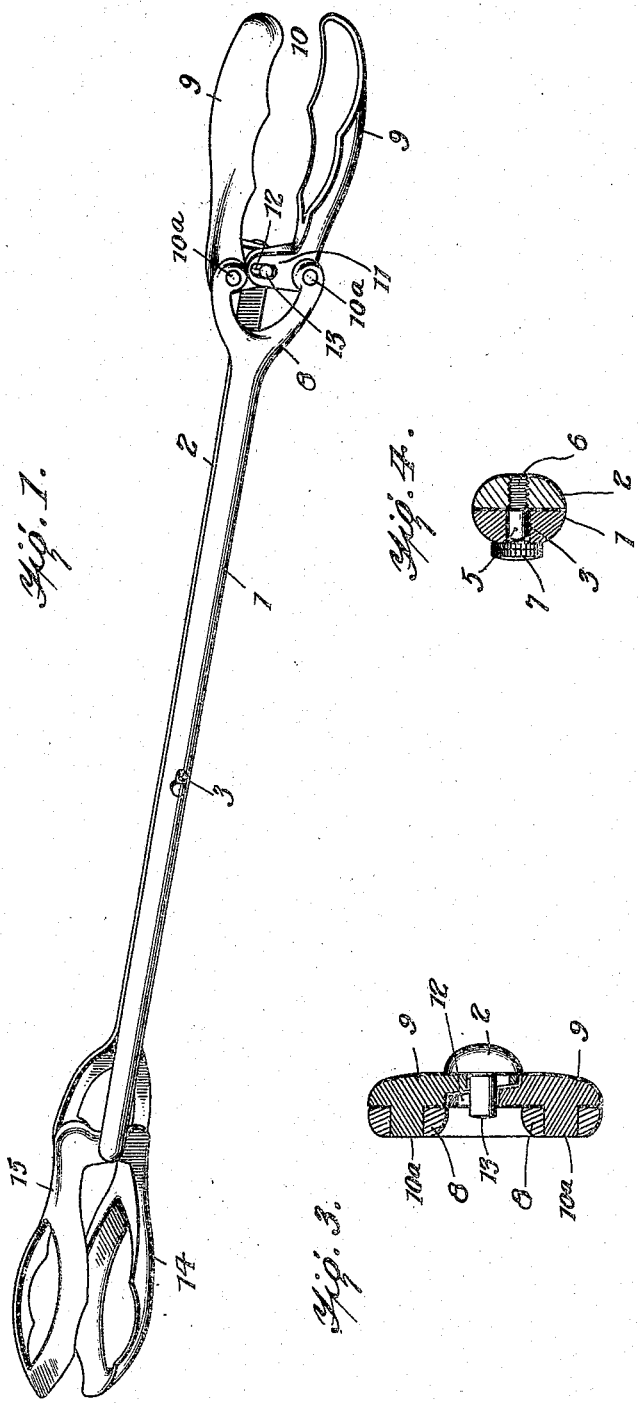

WILLIAM ROBERTSON, OF VAIL, IOWA.

PIG-FORCEPS.

No. 930,886.   Specification of Letters Patent.   Patented Aug. 10, 1909.

Application filed March 17, 1909. Serial No. 484,010.

*To all whom it may concern:*

Be it known that I, WILLIAM ROBERTSON, a citizen of the United States, residing at Vail, in the county of Crawford and State of Iowa, have invented a new and useful Improvement in Pig-Forceps, of which the following is a specification.

My invention is an improvement in pig forceps, and consists in certain novel constructions and combinations of parts hereinafter described and claimed.

Referring to the drawings forming a part hereof, Figure 1 is a perspective view of the improvement. Fig. 2 is a plan view. Fig. 3 is a transverse section through one pair of blades, and Fig. 4 is a similar view through the pivot.

The embodiment of the invention shown in the drawings, comprises a pair of shanks 1, 2 substantially semi-circular in cross section, and arranged with their flat sides in contact. One of the shanks is provided at approximately its longitudinal center with a threaded opening, and the other with a slot 3, and a screw having a plain portion 5 adjacent the milled head 7 and a threaded portion 6, connects the shanks pivotally, the plain portion passing through the slot and the threaded portion engaging the threaded opening.

The shank 1 is provided at one end with a fork 8, and a blade 9 is pivoted to each arm of the fork by a rivet 10ª, or other suitable means. Each blade comprises a curette shaped portion 10, for grasping the pig, and an angular portion 11 provided with a slot 12. The angular portions extend toward each other and overlap as shown in Fig. 1, and the adjacent end of the shank 2 is provided with a lateral pin 13 which passes through the registering slots. It will be evident from the description, that when the shanks are moved longitudinally, with respect to each, which movement is permitted by the slot, the blades 9 will be opened and closed, to grasp or release the pig. The shanks are provided at their opposite ends with other blades 14, 15, connected to the shanks in precisely the same manner as are the blades 9, the shank 2 being provided with the fork however, and the shank 1 with the pin. That is the arrangement of the blades at one end is the reverse of the arrangement at the other end. It will be observed, that the blades 14, 15, are of larger size than the blades 9, and are each provided with an opening therethrough forming a ring instead of a spoon shape. The grasping edges of all the blades are irregular in outline as shown, being serrated coarsely to furnish better gripping surface.

The connection 10ª between the arms of the forks, and the heel of the blades, described as a rivet is shown as integral with the respective blade in Fig. 3, as is also the lateral pin 13. Neither the pin 13 nor the connections 10ª are headed, so that the parts may be easily disconnected for cleaning, merely by removing the screw connecting the shanks.

The operation of the improvement will be clear from the description, and it is not thought necessary to further describe the same. It will be evident that they may be easily inserted and engaged with the presenting portion of the pig, and when once engaged will retain a firm grasp thereon. The different sized pairs of blades also provide for the use of the same instrument on large and small animals.

I claim—

1. A forceps comprising a plurality of shanks, one provided at its center with a threaded opening and the other with a slot, and a screw traversing the slot and engaging the opening, each of said shanks being provided at one end with a fork, and at the other with a lateral pin, the shanks being oppositely arranged with respect to each other, and with the pin of one shank between the arms of the fork of the other, said arms having each a lateral pin projecting toward the pin of the other shank, a blade comprising a shank having an opening for receiving the lateral pin of an arm, a blade portion and an angular portion projecting from the shank at right angles to the blade and provided with a slot, the slots of the blades at one end registering with each other and being both traversed by the lateral pin of the other shank.

2. A device of the class described, comprising shanks slidable longitudinally upon each other, means for limiting said sliding movement, each being provided at one end with a lateral pin, and at the other with a fork, a blade for each arm of the fork, each of said blades being pivoted to the respective arm, and having an angular portion provided with a slot, the lateral pin of the other shank engaging the slots of the adjacent arms for the purpose set forth.

WILLIAM ROBERTSON.

Witnesses:
  JOHN McGOVERN,
  ARTHUR OSTERLUND.